United States Patent [19]
Bishop et al.

[11] Patent Number: 5,826,082
[45] Date of Patent: Oct. 20, 1998

[54] METHOD FOR RESERVING RESOURCES

[75] Inventors: Alan Bishop, Mountain View; Graham Hamilton, Palo Alto; Theron Tock, Sunnyvale, all of Calif.

[73] Assignee: Sun Microsystems, Inc., Mountain View, Calif.

[21] Appl. No.: 671,313

[22] Filed: Jul. 1, 1996

[51] Int. Cl.$^6$ .................................................... G06F 9/00
[52] U.S. Cl. .......................................... 395/674; 395/670
[58] Field of Search .................................. 395/670, 672, 395/674, 115; 358/296

[56] References Cited

U.S. PATENT DOCUMENTS

| 5,495,339 | 2/1996 | Stegbauer et al. | 358/296 |
| 5,535,312 | 7/1996 | Hammer et al. | 395/115 |
| 5,632,032 | 5/1997 | Ault et al. | 395/670 |

OTHER PUBLICATIONS

Krasner, Glenn, *The Smalltalk–80 Virtual Machine*, BYTE Publications Inc., Aug. 1991, pp. 300–320.
Kin–Man Chung and Herbert Yuen, "A 'Tiny' Pascal Compiler: the P–Code Interpreter," *BYTE Publications, Inc.*, Sep. 1978, pp. 59–65 and 148–155.
Kin–Man Chung and Herbert Yuen, "A 'Tiny' Pascal Compiler: Part 2: the P–Compiler," *BYTE Publications, Inc.*, Oct. 1978, pp. 34–52, (even pages only).
Ken Thompson, "Regular Expression Search Algorithm," *Communications of the ACM*, vol. II, No. 6, Jun. 1968 at 419 et seq., pp. 419–422.
James G. Mitchell, William Maybury and Richard Sweet, *Mesa Language Manual*, a Xerox Corporation Document.
Gene McDaniel, *An Analysis of a Mesa Instruction Set*, a Xerox Corporation Document.
Kenneth A. Pier, *A Retrospective on th Dorado, A High--Performance Personal Computer*, a Xerox Corporation document.
Kenneth A. Pier, *A Retrospective on the Dorado, A High--Performance Personal Computer*, a Xerox Corporation document, pp. 252–269.

*Primary Examiner*—Majid A. Banankah
*Attorney, Agent, or Firm*—Blakely Sokoloff Taylor & Zafman

[57] ABSTRACT

A method for managing resources in a computer system. According to one embodiment of the invention, a resource manager receives a first request of a first operation. The first request identifies a first resource and specifies an amount of the first resource needed to execute the first operation. In response, a resource manager determines if the amount of the first resource requested by the first request is available to be reserved. In response to the amount of the first resource requested by the first request being available to be reserved, the resource manager reserves the amount of the first resource requested by the first request in advance of allocating the first resource to the first operation.

45 Claims, 3 Drawing Sheets

METHOD FOR RESERVING RESOURCES

FIELD OF THE INVENTION

The present invention relates to computer systems, and, in particular, to reserving and managing computer system resources.

BACKGROUND OF THE INVENTION

In computing environments such as embedded systems, set-top boxes, or general purpose computers where resources (e.g. memory) are limited, software is developed to accommodate the uncertainty of whether resources needed to complete an operation will be available.

For general purpose computers, well written software requests resources as they become needed and verifies that the requested resources were actually provided. If it is determined that a resources was not provided, the operation being performed is aborted part-way through, and any resources allocated in earlier stages of the operation are returned to the system.

In a system with scarce resources, however, this approach does not perform well. For example, if there are only enough resources available for one operation to execute until completion, but the system begins two operations, both operations may fail halfway through.

Some systems attempt to solve this problem by dedicating pools of resources for specific operations. This approach also has problems.

Consider the example that we have two operations, A and B. Each operation is only allocated 100 bytes of memory. Further consider the case where operation A is not using its 100 bytes of memory and B needs 150 bytes of memory. Even though the 200 bytes of memory are available in the system, operation B cannot proceed since 100 bytes of the systems memory are only available to operation A.

Some programmers attempt to solve this problem by preallocating resources. For example, if a programmer knows that they need 100 bytes of memory at the start of an operation, another 100 bytes halfway through, and 100 bytes at the end of the operation, then the programmer would allocate 300 bytes of memory before beginning the operation.

Preallocating resources, however, has at least three drawbacks. First, in an object oriented environment, there may be no way to allocate resources of the correct object type in advance. A programmer would have to allocate uninitialized instances of a class and initialize them later. However, many class implementors prohibit the creation of uninitialized instances of their class.

Second, most code is not written with preallocation in mind. Therefore, when integrating code that has preallocated resources with existing code that has not preallocated any resources, there is no way to direct the existing code to use the resources that may have been preallocated. Third, preallocation of resources prohibits intelligent management by the system. From the perspective of the system, once a resource has been allocated, the resource is considered to be in use. Therefore, even if some of the resources that have been allocated are not actually in use, the system may not manage the allocated resources (e.g., temporarily loan some of the allocated memory to a separate operation).

SUMMARY OF THE INVENTION

One embodiment of the invention provides a method for managing resources in a computer system. According to one embodiment of the invention, a resource manager receives a first request of a first operation. The first request identifies a first resource and specifies an amount of the first resource needed to execute the first operation. In response, a resource manager determines if the amount of the first resource requested by the first request is available to be reserved. In response to the amount of the first resource requested by the first request being available to be reserved, the resource manager reserves the amount of the first resource requested by the first request in advance of allocating the first resource to the first operation.

BRIEF DESCRIPTION OF THE DRAWINGS

One embodiment of the invention is illustrated by way of example and not limitation in the figures of the accompanying drawings, in which like references indicate similar elements, and in which.

DETAILED DESCRIPTION

A method is described for reserving resources in advance of allocating the resources.

Figure 1:
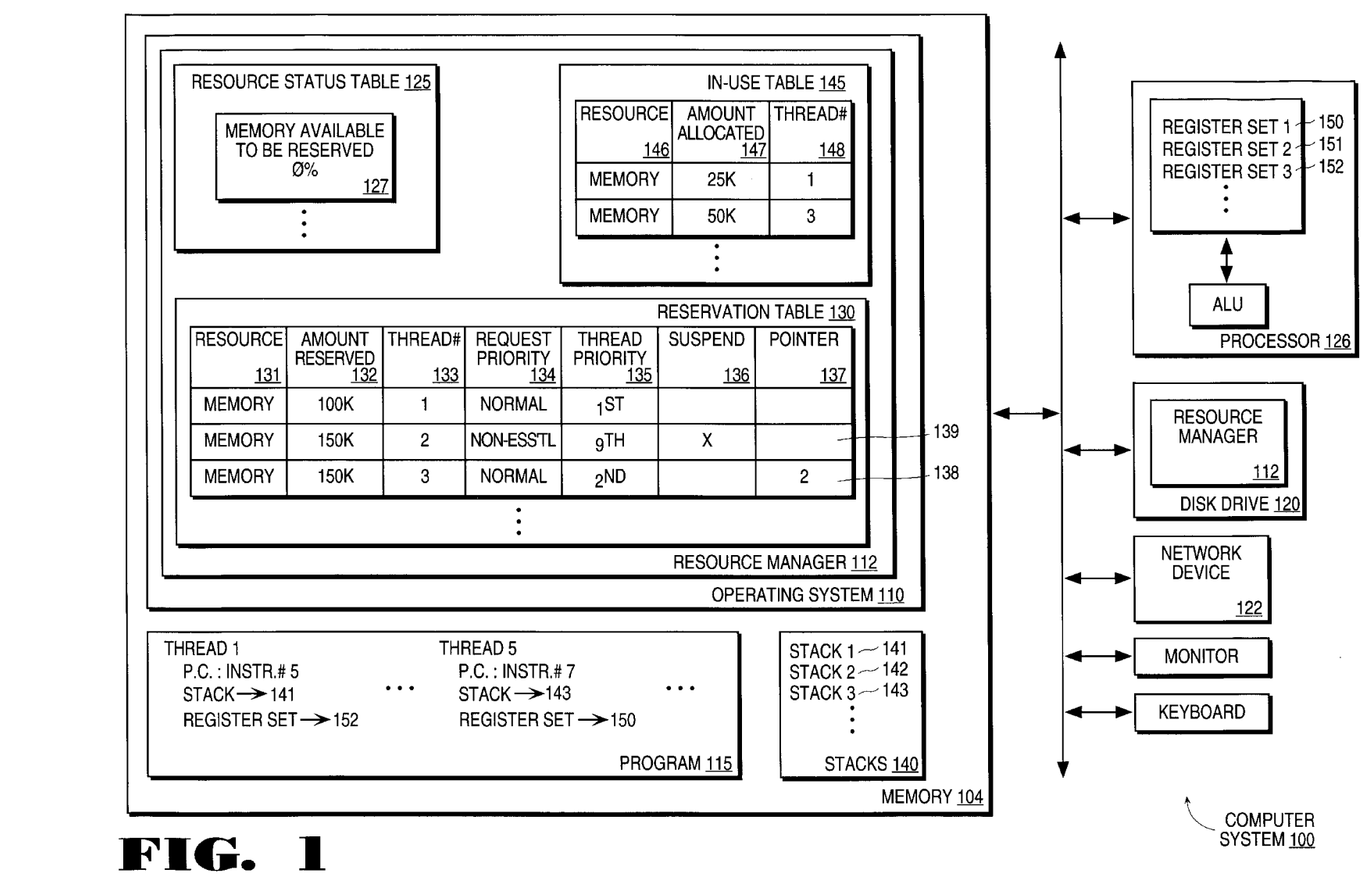
FIG. 1 illustrates a computer system capable of implementing one embodiment of the invention.

Referring to FIG. 1, the computer system upon which the one embodiment of the invention can be implemented is shown as 100. Shown in the memory 104 of computer system 100 is an operating system 110, which controls the execution of user application programs and provides services such as scheduling, data input/output control, and other data management responsibilities.

Included in the operating system is the resource manager 112, which is a control program responsible for the allocation of the computer system's resources. The resource manager 112 could alternatively be stored on a computer-readable medium, such as a magnetic disk, accessible via the disk drive unit 120, shown included in the computer system of FIG. 1. The resource manager 112 could also be stored on a separate computer system and accessed over a network connection to the computer system 100 via the network device 122 also shown included in the computer system 100.

Also included in the memory 104 is the multi-threaded program 115, which as shown, is presently being executed. In modern interactive software, a single program can be made up of multiple control flows, commonly referred to as "threads of control" (threads). Threads extend the concept of switching between several different running programs (i.e. processes), to switching between several different functions executing simultaneously within a single program (i.e., multitasking in a single program). As a result, higher throughput and better performance of a single program is achieved because one thread can run while another thread is sleeping (e.g., fetching data from a disk).

Multiple threads belonging to one program share the same address space, however, each thread does have its own program counter (P.C.), register set, and stack. As a result, the overhead of switching between threads (e.g. saving the state of a few registers, a stack pointer, a program counter, etc.) is considerably less than the overhead incurred when switching between processes (e.g. saving the state of virtual memory maps, file descriptors, etc.).

Computer resources are allocated to each thread in order to complete the respective operation associated with each thread. The resources allocated could include random access memory, network bandwidth, a display, a printer, or any other device of the computer system that can be allocated to an operation of a running program.

In order to obtain the resources needed to complete execution of the operation, each thread submits a request to the resource manager 112. The resource manager reads the request to determine the resource requested and the amount requested. The resource manager then reads the Resource Status Table 125 (RST) to determine if the requested amount of the requested resource is available.

In one embodiment, the RST includes an available indicator for each resource, which shows how much of that particular resource is available to be reserved (e.g., 127). In an alternative embodiment, a reserved indicator could be used to show the amount of each resource that is presently reserved.

If the requested amount of the requested resource is available, the resource manager reserves the requested amount of the requested resource (hereinafter referred to as the reserved resource). On the other hand, if the requested amount of the requested resource is not available, the requesting thread may choose not to begin its operation.

When reserving the requested amount of the requested resource, the resource manager inserts an entry into the Reservation Table 130 for the reserved resource. Each entry in the Reservation Table identifies the reserved resource, the amount of the resource reserved, and the thread that has reserved the resource. In addition, the resource manager updates the RST to reflect the reservation.

Sometime after the reservation, the reserved resource is allocated to the thread for which it has been reserved. By reserving a part of a resource for a request prior to allocating the resource to the request, the thread requesting the resource is certain to have enough of the resource to complete its operation.

When the reserved resource is allocated to the requesting thread, the resource manager updates the In-use Table 145 (IT) to show the reserved resource is presently allocated to a thread. When a resource has been allocated to a thread it is assumed, from the perspective of the resource manager and the computer system, that the amount of the resource that has been allocated is in use.

In alternative embodiments, the invention provides a manner of intelligently managing the resources that have been reserved. For example, by separating the reservation of resources from the allocation of resources, a system may know which resources are currently being used and which resources are not being used. As a result, resources not in use, but reserved by a thread can be temporarily loaned to a higher priority operation.

Figure 2A:
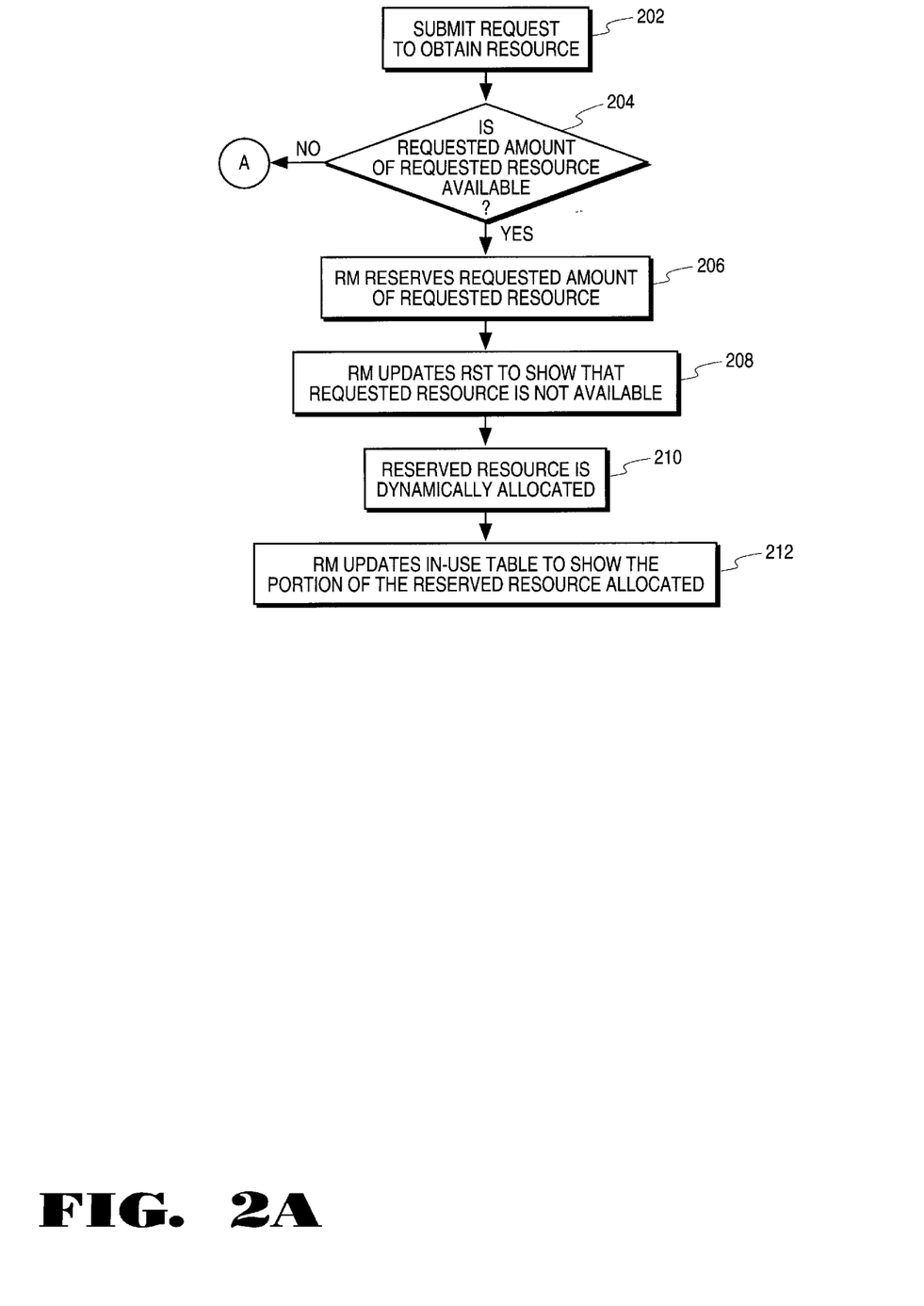
FIG. 2a is a flow diagram describing the steps in one embodiment of the invention.
Figure 2B:
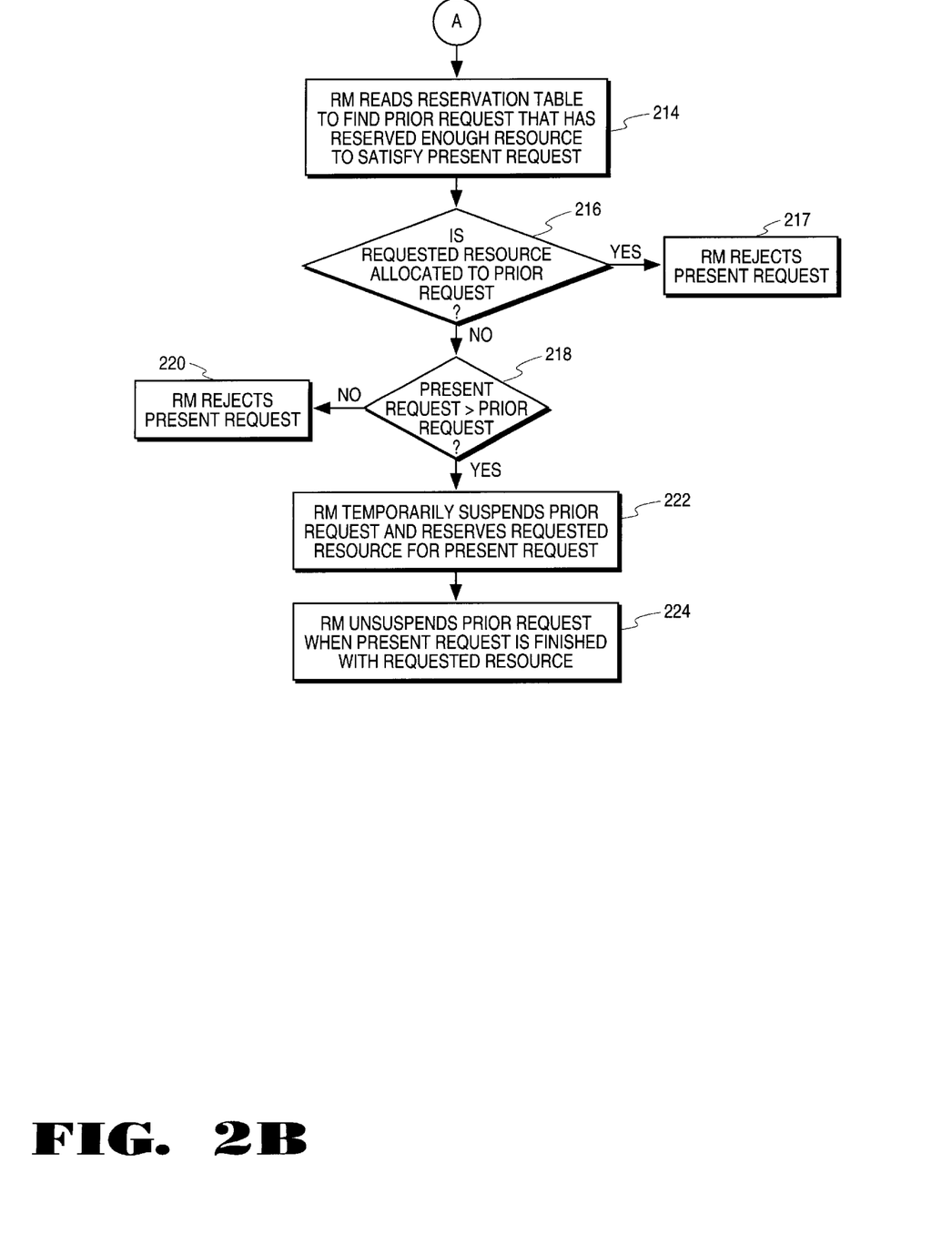
FIG. 2b is a flow diagram describing the steps in one embodiment of the invention.

Referring to FIG. 2, a flow diagram is illustrated describing the steps of the performing the invention according to one embodiment. In block 202, a thread submits a request to the resource manager to obtain the resources need to complete execution of an operation associated with the thread. In one embodiment, each request of a thread identifies a resource, the amount requested, and the priority of the request. In alternative embodiments, the requesting thread may also include its own priority relative the other threads of the program 115.

After reading the request of a thread, in decision block 204, the resource manager reads the available indicator (e.g. 127) of the Resource Status Table 125 (RST) to determine if the requested amount of the requested resource is available to be reserved. In an alternative embodiment, in decision block 204 the resource manager may also determine whether the amount of the requested resource is available to be reserved is below a predetermined threshold, wherein the amount of the requested resource available to be reserved would be considered relatively low.

If the requested amount of the requested resource is available, or in the alternative embodiment, exceeds the predetermined threshold, in block 206 the resource manager reserves the requested amount of the requested resource (hereinafter referred to as the reserved resource).

More specifically, the resource manager inserts an entry 138 into the Reservation Table 130. In one embodiment, each entry of the Reservation Table identifies the requested resource 131, the amount of the resource that is being reserved for the requesting thread 132, the thread that has requested the resource 133, the priority of the request as normal or non-essential 134, and possibly indicate the priority of the requesting thread 135. In alternative embodiments, the entries of the RST may vary within the scope of the invention, so long as they indicate which resources have been allocated. Moreover, the priority levels other than normal or non-essential can be assigned to the request of each requesting thread without deviating from the scope of the invention.

In block 208, the resource manager updates the available indicator 127 of the RST to show that the reserved resource is not available to be reserved.

In block 210, sometime after the resource manager has reserved the requested amount of the requested resource, the reserved resource is dynamically allocated to the respective thread for which it has been reserved. The dynamic allocation is defined as allocating portions of the reserved resource to the requesting thread as the reserved resource is needed by the requesting thread.

In response to part of the reserved resource being dynamically allocated to the requesting thread, in block 212, the resource manager updates the In-use Table 145 to show the amount of the reserved resource that is presently allocated to the thread which has requested the resource. In one embodiment, each entry of the In-use Table may indicate the resource 146, the amount presently allocated 147, and thread to which the resource has been allocated 148.

For example, if a thread1 has reserved 100 kilobytes (K) of memory, but initially is only allocated 25K, the entry for thread1's In-Use table will indicate only 25K has been allocated to thread1. Moreover, if thread1 is initially allocated 100K of memory and part way through its execution, thread1 is finished with 50K of the memory, the resource manager may update thread's entry to show that only 50K of memory is now allocated to thread1.

In one embodiment, if the resource manager determines in decision block 204 that the requested amount of the requested resource is not available, or in the alternative embodiment, determines that the amount available is below the predetermined threshold, the resource manager attempts to suspend a prior request. In an alternative embodiment, when the requested resource is below the predetermined level, the resource manager may be programmed to reject the request if the request is non-essential or the priority of the thread requesting the resource is below a predetermined level of priority.

When attempting to suspend a prior request, in block 214, the resource manager reads the Reservation table to find a prior request of a separate thread that has already reserved enough of the requested resource to satisfy the present request which has been unable to reserve part of the requested resource. In an alternative embodiment, the resource manager may attempt to suspend a group of prior requests, which together have reserved enough of the requested resource to satisfy the present request.

Once the resource manager has found a prior request which has reserved enough of the requested resource to satisfy the present request, in block 216, the resource manager reads the In-use Table to determine how much of the requested resource has been allocated to the prior request. If the requested resource is unallocated to the prior request, or if enough of the requested resource to satisfy the present request is unallocated to the prior request, in decision block 218, the resource manager performs a logical comparison between the prior request and the present request. Otherwise, in block 217, the resource manager rejects the present request.

The logical comparison performed by the resource manager in block 218 is predetermined. The logical comparison, for example, may compare the priority of the present request with the priority of the prior request, and/or the priority of the present requesting thread to the priority of the prior requesting thread.

If the prior request exceeds the present request in the comparison, in block 220, the resource manager will reject the present request or attempt to suspend another prior request. On the other hand, if the present request exceeds the prior request in the logical comparison, in block 222 the resource manager will temporarily suspend the prior request and insert an entry in the reservation table for the present request. Suspending the prior request is transparent to a user of the computer system.

In one embodiment, the entry of the present request in the Reservation Table will include a pointer 137 to the suspended prior request. As a result, when the present request is finished with the requested resource, the resource manager will read the pointer to determine which prior request to unsuspend. Moreover, the entry of the suspended request in the Reservation Table, may include a field 136 that is set to indicate the respective request is presently suspended.

Consider the example shown in the memory of FIG. 1. The third thread 138 submitted a request to the resource manager to obtain 150K of memory. The resource managers read the RST and determined that all of memory has been reserved. The resource manager then read the reservation table and saw that the second thread 139 has reserved 150K of memory, enough to satisfy the request of the third thread 139.

The resource manager then compared the priority of the third thread's request for memory (normal) with the priority of the second thread's request for memory (non-essential). The resource manager may also have compared the priority of the third request (2nd) to the priority of the second request (9th).

After, the resource manager had determined the third thread's request exceeded the second thread's request, the resource manager then read the In-use table and determined that no memory had been allocated to the second thread. As a result, the resource manager suspended the request of the second thread 139 and inserted an entry into the Reservation Table for the request of the third thread 138.

The entry in the Reservation Table for the request of the third thread 139 includes a pointer to the request of the second thread. As a result, after the third thread is finished with the memory, the resource manager will read the pointer of the request for the third thread and unsuspend the second thread's request for memory, as is shown in block 224.

In the foregoing specification the invention has been described with reference to specific exemplary embodiments thereof. It will, however, be evident that various modifications and changes may be made thereto without departing from the broader spirit and scope of the invention. For instance, where it has been shown that the resource manager, including the RST, the In-use Table, and the Reservation Table are in memory 104, these items may also be stored on a magnetic or optical disk and accessed via the disk drive 120.

The specification and drawings are, accordingly, to be regarded in an illustrative rather than restrictive sense. Moreover, the following claims indicate the scope of the invention, and all variations which come within the meaning and range of equivalency of the claims are to be embraced within their scope.

What is claimed is:

1. A computer-implemented method for managing resources in a computer system comprising the steps of:

a resource manager receiving a first request of a first operation, said first request identifies a first resource and specifies an amount of the first resource needed to execute the first operation;

the resource manager determining if the amount of the first resource specified by the first request, is available to be reserved;

in response to the amount of the first resource specified in the first request being available to be reserved, the resource manager reserving the amount of the first resource specified in the first request in advance of allocating the first resource to the first operation; and after reserving said first resource for said first request, temporarily allocating said first resource to a second request prior to allocating said first resource to said first request.

2. The computer-implemented method of claim 1, wherein the first operation is a first thread of a set of threads belonging to one program.

3. The computer-implemented method of claim 2, further including the step of:

in response to the amount of the first resource being unavailable to be reserved, the resource manager rejecting the first request.

4. The computer-implemented method of claim 2, wherein the resource manager includes a resource status table indicating an amount of the first resource available to be reserved by a thread;

said resource manager includes a reservation table to store resource reservations for the set of threads, wherein each entry in the reservation table identifies a resource, an amount of the resource reserved, and a thread for which the resource has been reserved, and said resource manager further includes an in-use table, said in-use table indicates an amount of a resource having been allocated to a thread.

5. The computer-implemented method of claim 3, wherein the step of determining if the amount of the first resource specified by the first request is available, further includes reading the resource status table to determine if the amount of the first resource specified by the first request, is available to be reserved.

6. The computer-implemented method of claim 5, wherein the step of the resource manager reserving further includes the steps of:

inserting an entry into the reservation table; and updating the resource status table to indicate the amount of the first resource specified in the first request is unavailable to be reserved.

7. The computer-implemented method of claim 6, further including the step of:

dynamically allocating at least a part of the first resource to the first thread, wherein the resource manager updates the in-use table to indicate the part of the first resource presently allocated to the first thread.

8. The computer-implemented method of claim 7, further including the steps of:

in response to the first thread being finished with the first resource, updating the resource status table to indicate an amount of the first resource allocated to the first thread is available to be reserved, and updating the in-use table to indicate the amount of the first resource allocated to the first thread is available to be allocated.

9. The computer-implemented method of claim 8, wherein the step of the resource manager determining if the amount of the first resource specified by the first request is available further includes the steps of:

the resource manager reading the resource status table to determine if an amount of the first resource available to be reserved is below a predetermined threshold.

10. The computer-implemented method of claim 9, further including the step of:

in response to the amount of the first resource available to be reserved being below the predetermined threshold and the priority of the first request being nonessential or a priority of first thread being below a predetermined priority, the resource manager rejecting the first request.

11. The computer-implemented method of claim 10, wherein the step of the resource manager determining if the amount of the first resource specified by the first request is available to be reserved, further includes the steps of:

in response to the amount of the first resource specified by the first request being unavailable or the amount of the first resource available to be reserved being below the predetermined threshold, the resource manager performing a predetermined logical comparison of the first request of the first thread to a second request of a second thread, said resource manager having reserved at least a part of the first resource for the second request in advance of allocating the first resource to the second thread; and in response to the first request of the first thread exceeding the second request of the second thread in the logical comparison, the resource manager temporarily suspending the second request of the second thread and reserving at least a part of the first resource for the first request of the first thread.

12. The computer-implemented method of claim 11, further comprising the steps of:

unsuspending the second request of the second thread after the first thread is finished with the first resource.

13. The computer-implemented method of claim 12, further includes the step of:

in response to the second request of the second thread exceeding the first request of the first thread in the logical comparison, the resource manager rejecting the first request of the first thread.

14. The computer-implemented method of the claim 13, wherein the resource manager is part of an operating system of a limited resource computer system.

15. A computer-readable medium having stored thereon a plurality of sequences of instructions, said sequences of instructions including instructions which, when executed by a processor, cause said processor to perform the steps of:

receiving a first request of a first operation, said first request identifies a first resource and specifies an amount of the first resource needed to execute the first operation;

determining if the amount of the first resource specified by the first request, is available to be reserved;

in response to the amount of the first resource specified in the first request being available to be reserved, reserving the amount of the first resource specified in the first request in advance of allocating the first resource to the first operation; and after reserving said first resource for said first request, temporarily allocating said first resource to a second request prior to allocating said first resource to said first request.

16. The computer-readable medium of claim 15, wherein the first operation is a first thread of a set of threads belonging to one program.

17. The computer-readable medium of claim 16, further having stored thereon additional instructions which, when executed by a processor, cause said processor to perform the step of:

in response to the amount of the first resource being unavailable to be reserved, rejecting the first request.

18. The computer-readable medium of claim 16, wherein the resource manager includes a resource status table indicating an amount of the first resource available to be reserved by a thread;

said resource manager includes a reservation table to store resource reservations for the set of threads, wherein each entry in the reservation table identifies a resource, an amount of the resource reserved, and a thread for which the resource has been reserved, and said resource manager further includes an in-use table, said in-use table indicates an amount of a resource having been allocated to a thread.

19. The computer-readable medium of claim 18, wherein the step of determining if the amount of the first resource specified by the first request is available, further includes reading the resource status table to determine if the amount of the first resource specified by the first request, is available to be reserved.

20. The computer-readable medium of claim 19, wherein the step of the resource manager reserving further includes the steps of:

inserting an entry into the reservation table; and updating the resource status table to indicate the amount of the first resource specified in the first request is unavailable to be reserved.

21. The computer-readable medium of claim 20, further having stored thereon additional instructions which, when executed by a processor, cause said processor to perform the step of: the step of:

dynamically allocating at least a part of the first resource to the first thread, wherein the resource manager updates the in-use table to indicate the part of the first resource presently allocated to the first thread.

22. The computer-readable medium of claim 21, further having stored thereon additional instructions which, when executed by a processor, cause said processor to perform the step of:

in response to the first thread being finished with the first resource, updating the resource status table to indicate an amount of the first resource allocated to the first thread is available to be reserved, and updating the in-use table to indicate the amount of the first resource allocated to the first thread is available to be allocated.

23. The computer-readable medium of claim 22, wherein the step of determining if the amount of the first resource specified by the first request is available further includes the steps of:

the resource manager reading the resource status table to determine if an amount of the first resource available to be reserved is below a predetermined threshold.

24. The computer-readable medium of claim 23, further having stored thereon additional instructions which, when executed by a processor, cause said processor to perform the step of:

in response to the amount of the first resource available to be reserved being below the predetermined threshold and the priority of the first request being nonessential or a priority of first thread being below a predetermined priority, the resource manager rejecting the first request.

25. The computer-readable medium of claim 23, wherein the step of determining if the amount of the first resource specified by the first request is available to be reserved, further includes the steps of:

in response to the amount of the first resource specified by the first request being unavailable or the amount of the first resource available to be reserved being below the predetermined threshold, the resource manager performing a predetermined logical comparison of the first request of the first thread to a second request of a second thread, said resource manager having reserved at least a part of the first resource for the second request in advance of allocating the first resource to the second thread; and in response to the first request of the first thread exceeding the second request of the second thread in the logical comparison, the resource manager temporarily suspending the second request of the second thread and reserving at least a part of the first resource for the first request of the first thread.

26. The computer-readable medium of claim 25, further having stored thereon additional instructions which, when executed by a processor, cause said processor to perform the step of:

unsuspending the second request of the second thread after the first thread is finished with the first resource.

27. The computer-readable medium of claim 26, further having stored thereon additional instructions which, when executed by a processor, cause said processor to perform the step of:

in response to the second request of the second thread exceeding the first request of the first thread in the logical comparison, the resource manager rejecting the first request of the first thread.

28. The computer-readable medium of the claim 27, wherein the resource manager is part of an operating system of a limited resource computer system.

29. A computer system configured to manage resources, the computer system comprising of:

a resource manager configured to receive a first request of a first operation, said first request identifies a first resource and specifies an amount of the first resource needed to execute the first operation;

the resource manager further configured to determine if the amount of the first resource specified by the first request, is available to be reserved; and the resource manager further configured to reserve, in response to the amount of the first resource specified in the first request being available to be reserved, the amount of the first resource specified in the first request in advance of allocating the first resource to the first operation, said resource manager further configured to temporarily allocate said first resource to a second request prior to allocating said first resource to said first request.

30. The computer system of claim 29, wherein the first operation is a first thread, said first thread is one of a set of threads belonging to one program, said set of threads sharing one address space, and each thread of said set of threads is allocated an individual program counter.

31. The computer system of claim 30, wherein the resource manager is further configured to reject the first request in response to the amount of the first resource being unavailable to be reserved.

32. The computer system of claim 30, wherein the resource manager includes a resource status table, said resource status table indicates an amount of the first resource available to be reserved by a thread;

said resource manager includes a reservation table, said reservation table stores resource reservations for the set of threads, wherein each entry in the reservation table identifies a resource, an amount of the resource reserved, a thread for which the resource has been reserved, and a priority of the request of the thread for which the resource has been reserved, and said resource manager further includes an in-use table, said in-use table indicates an amount of a resource having been allocated to a thread.

33. The computer system of claim 32, wherein the resource manager is configured to read the resource status table to determine if the amount of the first resource specified by the first request is available to be reserved.

34. The computer system of claim 33, wherein resource manager is configured to insert an entry into the reservation table and update the resource status table to indicate the amount of the first resource specified in the first request is unavailable to be reserved, in order to reserve the amount of the first resource specified in the first request.

35. The computer system of claim 34, wherein the resource manager is configured to dynamically allocate at least a part of the first resource to the first thread and update the in-use table to indicate the part of the first resource presently allocated to the first thread.

36. The computer system of claim 35, wherein the resource manager is configured to update, in response to the first thread being finished with the first resource, the resource status table to indicate an amount of the first resource allocated to the first thread is available to be reserved, and update the in-use table to indicate the amount of the first resource allocated to the first thread is available to be allocated.

37. The computer system of claim 36, wherein the resource manager is configured to read the resource status table to determine if an amount of the first resource available to be reserved is below a predetermined threshold.

38. The computer system of claim 37, the resource manager is configured to reject the first request in response to the amount of the first resource available to be reserved being below the predetermined threshold and the priority of the first request being nonessential or a priority of first thread being below a predetermined priority.

39. The computer system of claim 37, wherein the resource manager is configured to perform, in response to the amount of the first resource specified by the first request being unavailable or the amount of the first resource available to be reserved being below the predetermined threshold, a predetermined logical comparison of the first request of the first thread to a second request of a second thread, said resource manager having reserved at least a part of the first resource for the second request in advance of allocating the first resource to the second thread; and     the resource manager further configured to temporarily suspend, in response to the first request of the first thread exceeding the second request of the second thread in the logical comparison, the second request of the second thread and reserve at least a part of the first resource for the first request of the first thread.

40. The computer system of claim 39, wherein the resource manager configured to unsuspend the second request of the second thread after the first thread is finished with the first resource.

41. The computer system of claim 40, wherein the resource manager is configured to reject the first request in response to the second request of the second thread exceeding the first request of the first thread in the logical comparison.

42. The computer system of the claim 41, wherein the resource manager is part of an operating system of a limited resource computer system.

43. The computer-implemented method of claim 4, further including the step of:

in response to the first resource being below a predetermined level, the resource manager rejecting the first request if the first request is below a predetermined level of priority.

44. The computer-readable medium of claim 18, further having stored thereon additional instructions which, when executed by a processor, cause said processor to perform the step of:

in response to the first resource being below a predetermined level, the resource manager rejecting the first request if the first request is below a predetermined level of priority.

45. The computer system of the claim 32, wherein in response to the first resource being below a predetermined level, the resource manager rejects the first request if the first request is below a predetermined level of priority.

\* \* \* \* \*

UNITED STATES PATENT AND TRADEMARK OFFICE
CERTIFICATE OF CORRECTION

PATENT NO. : 5,826,082
DATED : October 20, 1998
INVENTOR(S) : Bishop et al.

It is certified that error appears in the above-identified patent and that said Letters Patent is hereby corrected as shown below:

Title page,
Item [56], References Cited, OTHER PUBLICATIONS, please delete "A Retrospective on th Dorado" and insert -- A "Retrospective on the Dorado --.

Column 8,
Line 38, please delete "18" and insert -- 44 --.

Column 10,
Line 33, please delete "32" and insert -- 45 --.

Signed and Sealed this

Twenty-third Day of July, 2002

Attest:

Attesting Officer

JAMES E. ROGAN
Director of the United States Patent and Trademark Office